United States Patent
Bhatt et al.

(10) Patent No.: US 12,506,700 B2
(45) Date of Patent: Dec. 23, 2025

(54) AI-DRIVEN GRAY ROUTE REDUCTION

(71) Applicant: DISH Wireless L.L.C., Littleton, CO (US)

(72) Inventors: Mihir Bhatt, Denver, CO (US); Jaynish Patel, Muskegon, MI (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 18/602,870

(22) Filed: Mar. 12, 2024

(65) Prior Publication Data

US 2025/0294001 A1 Sep. 18, 2025

(51) Int. Cl.
*G06F 15/16* (2006.01)
*H04L 51/212* (2022.01)
*H04L 51/222* (2022.01)

(52) U.S. Cl.
CPC .......... *H04L 51/212* (2022.05); *H04L 51/222* (2022.05)

(58) Field of Classification Search
None
See application file for complete search history.

(56) References Cited

U.S. PATENT DOCUMENTS

| | | | | |
|---|---|---|---|---|
| 2020/0322483 A1* | 10/2020 | Anand | .................. | H04M 15/47 |
| 2020/0374251 A1* | 11/2020 | Warshaw | ................ | H04L 51/56 |
| 2022/0141165 A1 | 5/2022 | Lee et al. | | |
| 2022/0167246 A1 | 5/2022 | Lim et al. | | |
| 2022/0182490 A1* | 6/2022 | Anand | .............. | H04M 3/42059 |
| 2022/0394435 A1 | 12/2022 | Coric et al. | | |
| 2023/0247033 A1 | 8/2023 | Rapp et al. | | |
| 2023/0282635 A1* | 9/2023 | Fujimura | ............... | H10D 89/10 |
| 2023/0294002 A1 | 9/2023 | Salazar et al. | | |
| 2023/0358551 A1* | 11/2023 | Beaurepaire | ....... | G01C 21/3423 |
| 2024/0202655 A1* | 6/2024 | Jordi Ballester | ........................... | G06Q 10/08355 |
| 2024/0333683 A1 | 10/2024 | Šestan et al. | | |
| 2024/0355337 A1 | 10/2024 | Altaf et al. | | |
| 2024/0356968 A1 | 10/2024 | Sinks et al. | | |
| 2025/0037045 A1* | 1/2025 | Xiao | ...................... | G06Q 10/20 |

* cited by examiner

*Primary Examiner* — Phuoc H Nguyen

(74) *Attorney, Agent, or Firm* — Kilpatrick Townsend & Stockton LLP

(57) ABSTRACT

A method for detecting gray routed messages may include receiving a message from a sender via a network. The method may include determining one or more characteristics of the message. The method may include providing the one or more characteristics to a machine learning model, the machine learning model configured to assign a score to the message based at least in part on the one or more characteristics of the message. The method may include determining that the message is a gray-routed message based at least in part on the score assigned to the message. Based on a determination that the message is a gray-routed message, the method may include transmitting data indicating the message, the one or more characteristics of the message, and the sender to a contextual filtering system, the contextual filtering system configured to identify and filter gray-routed messages from the network.

19 Claims, 9 Drawing Sheets

AI-DRIVEN GRAY ROUTE REDUCTION

BACKGROUND

As organizations continue to utilize technology to reach individuals, bad actors continue to find new ways to abuse the same technologies. Application to person (A2P) messaging is one such technology. A bad actor may try to take advantage not only of the recipient of a message, but the network(s) involved in the messaging as well. The messages may be received via illegitimate routes called "gray-routes" that avoid may detection and pose issues in the collection of appropriate charges.

BRIEF SUMMARY

A method for detecting gray routed messages may include receiving, by a computing system, a message from a sender via a network. The method may include determining, by the computing system, one or more characteristics of the message. The method may include providing, by the computing system, the one or more characteristics to a machine learning model, the machine learning model configured to assign a score to the message based at least in part on the one or more characteristics of the message. The method may include determining, by the computing system, that the message is a gray-routed message based at least in part on the score assigned to the message. Based on a determination that the message is a gray-routed message, the method may include transmitting, by the computing system, data indicating the message, the one or more characteristics of the message, and the sender to a contextual filtering system, the contextual filtering system configured to identify and filter gray-routed messages from the network.

In some embodiments, the one or more characteristics may include data associated with content of the message. The method may then include determining, by the machine learning module, that the content of the message includes indicators associated with illegitimate messages. The method may include generating, by the machine learning model, the score for the message based at least in part on the indicators associated with the illegitimate messages and a comparison of the content of the message to a typical message. The machine learning model may include a natural language processing model.

In some embodiments, the one or more characteristics may include geographical data associated with the message. The method may then include determining, by the machine learning model, that the geographical data is associated with gray-routed messages. The method may include generating, by the machine learning model, the score for the message based at least in part on the determination that the geographical data is associated with gray routed messages. The machine learning model may include a geospatial data analysis model.

In some embodiments, the one or more characteristics of the message may include network information. The method may then include determining, by the machine learning model, that the network information of the message is atypical. The method may include generating, by the machine learning model, the score for the message based at least in part on the determination that the network information of the message is atypical. The machine learning model may include a clustering model.

A system for detecting gray routed messages may include one or more processors, a machine learning model, a contextual filtering system, and a non-transitory computer-readable medium. The non-transitory computer-readable medium may include instructions that, when executed by the one or more processors, cause the system to perform operations. According to the operations, the system may receive a message from a sender via a network. The system may determine one or more characteristics of the message. The system may provide the one or more characteristics to the machine learning model, the machine learning model configured to assign a score to the message based at least in part on the one or more characteristics of the message. The system may determine that the message is a gray-routed message based at least in part on the score assigned to the message. Based on a determination that the message is a gray-routed message, the system may transmit data indicating the message, the one or more characteristics of the message, and the sender to the contextual filtering system, the contextual filtering system configured to identify and filter illegitimate messages from the network.

In some embodiments, the network may be a cloud-based wireless network. The message may be an application to person (A2P) message. The machine learning model may include at least one of a clustering model, a sequential analysis model, and a natural language processing model.

In some embodiments, the instructions may further cause the system to receive data indicating an accuracy rating of the score assigned to the message. The system may provide the message and the data indicating the accuracy rating of the score to the machine learning model such that the machine learning model is retrained based at least in part on the message and the accuracy rating of the score. The system may store the message and/or the data indicating the accuracy rating of the score in a historical dataset. The machine learning model may include a rules-based filter, where rules of the rules-based filter are based at least in part on a regulation.

In some embodiments, the system may determine a first routing plan associated with the network. The system may provide the first routing plan to the machine learning model. The system may determine, by the machine learning model, a predicted traffic window of the network, the predicted traffic window characterized by an increased network load. The system may determine, by the machine learning model, a second routing plan such that messages are routed to prevent message congestion. The system may cause messages to be routed via the network according to the second routing plan. The machine learning model may include a time series forecasting model. The contextual filtering system may be associated with a 5G wireless network provider.

A non-transitory computer-readable medium may include instructions that, when executed by one or more processors, cause the one or more processors to perform operations. The operations may include receiving, by a computing system, a message from a sender via a network. The operations may include determining, by the computing system, one or more characteristics of the message. The operations may include providing, by the computing system, the one or more characteristics to a machine learning model, the machine learning model configured to assign a score to the message based at least in part on the one or more characteristics of the message. The operations may include determining, by the computing system, that the message is a gray-routed message based at least in part on the score assigned to the message. Based on a determination that the message is a gray-routed message, the operations may include transmitting, by the computing system, data indicating the message, the one or more characteristics of the message, and the sender to a contextual filtering system, the contextual filtering system configured to identify and filter gray-routed messages from the network.

In some embodiments, the network may include an open-radio access network of a 5G wireless network provider. The contextual filtering system may be associated with a 5G wireless network provider. The message may be an application to person message.

DETAILED DESCRIPTION

Figure 1:
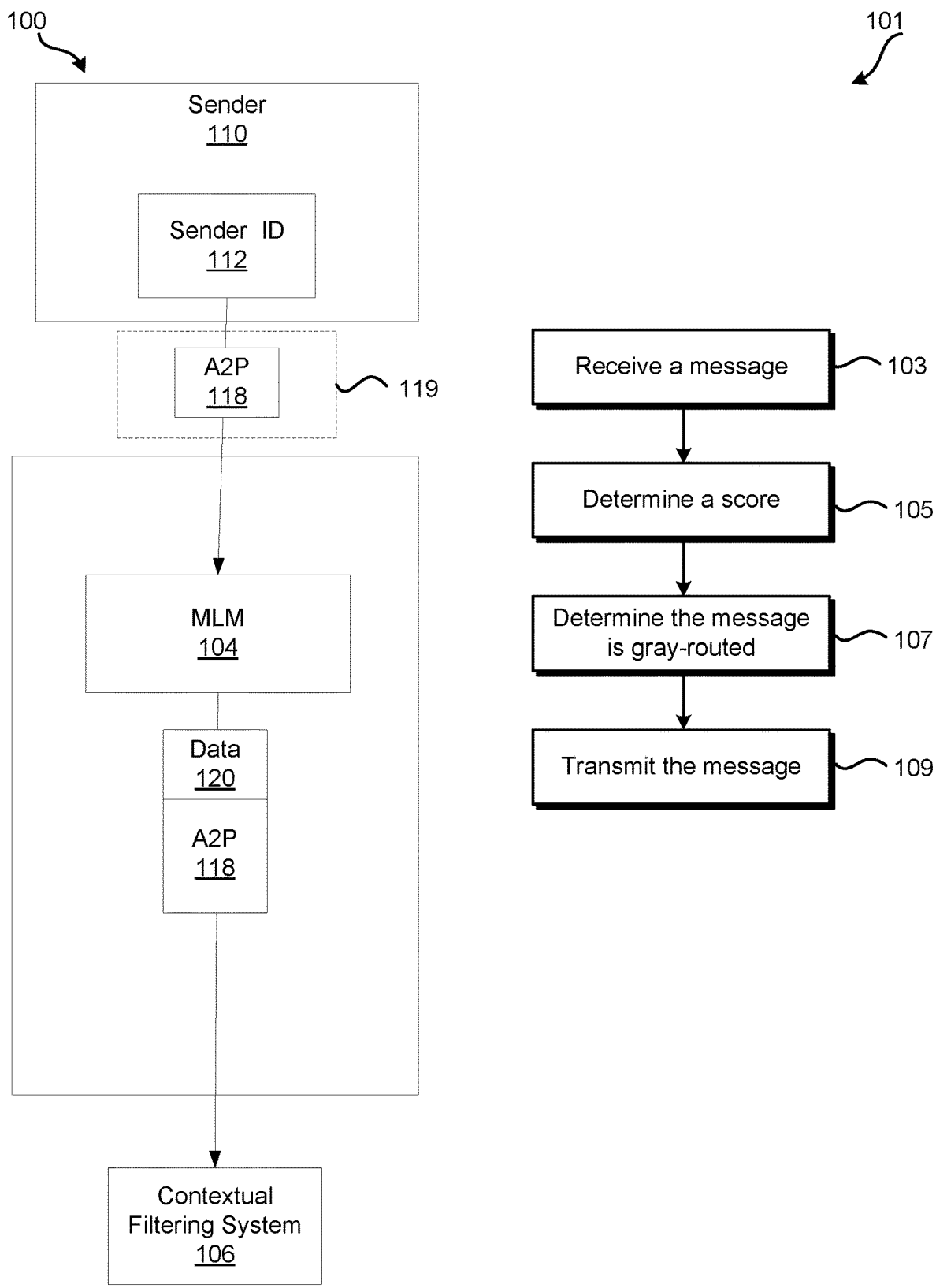
FIG. 1 illustrates a system and a process for detecting gray routed messages, according to certain embodiments.

Businesses and other entities are always looking for new ways to engage with their users (e.g., members, customers, etc.). Mailed advertisements have waned in favor of more targeted marketing via email, for example. Spam has since pervaded email generally, and many emails may be spoofed, or appear to be from someone other than the actual sender. The sender of these emails may be attempting to steal data or trick the recipient of the email or perform some other fraud. As technology has evolved again, however, bad actors have also evolved, attempting to leverage other systems with bad intentions.

One example of this is application to person (A2P) messaging. A2P messaging is prevalent already, and growing in use by many different entities. A small business, for example, may utilize a marketing service that sends short-messaging service (SMS) messages with coupons to one or more customers. An airline may send an SMS reminder about a flight status to a group of passengers or related individuals. A financial institution may send a one-time code via SMS to a user for dual authentication purposes. Other examples of A2P messaging are readily evident. A bad actor, however, may generate an SMS that appears to be from a legitimate application (as described above) with a link to enter some personal data (e.g., phishing). In other words, the bad actor may send an SMS to take advantage of an end user. In another example, the bad actor may alternately route an otherwise legitimate message from an application through improper channels, avoiding paying the proper amount per SMS to a wireless network provider (e.g., a mobile network operator (MNO) or a mobile virtual network operator (MVNO)). This fraudulent routing of A2P messages may be referred to as "gray-routing."

Identifying gray-routed messages may pose challenges on any level of a communications network. For example, an end user may receive a gray routed message and not have any means with which to identify that the message is a gray routed message. In fact, in the case of spam and phishing messages, the goal of the gray-routed messages may be to appear to be authentic messages, coming from a known party. On an enterprise level, the IP addresses used (and locations) in a gray-routing scheme may change or be altered frequently, such that blacklisting or flagging each IP address discovered to be involved in gray-routing may be impractical. Thus, there is a need to discover and filter gray-routed A2P messages.

One solution may be to analyze at least some A2P messages are they enter a network (e.g., a 5G wireless network) via a cloud-based system. A machine learning model (MLM) may be trained on one or more data sets including historical A2P associated with various senders, historical illegitimate messages, and other such data. Then, an A2P message may be received from a sender (e.g., through an application for sending SMS messages to a number of recipients). The A2P message may be analyzed using the MLM to determine various characteristics about the message itself, the sender, and/or metadata about the A2P message. The characteristics may include linguistic characteristics may be determined, a geographical location (or locations), a format of the message (e.g., encoding), and other such characteristics. The MLM may then assign a score to the A2P message, indicating a probability that the A2P message has been gray routed. If the probability score is above a certain threshold, the A2P message may be flagged as a gray-routed message. The A2P message may then be filtered by the cloud-based system, such that one or more intended recipients do not receive the message. Furthermore, the message (or data indicating the message), may be transmitted to another system for contextually filtering messages.

FIG. 1 illustrates a system 100 and a process 101 for detecting gray routed messages, according to certain embodiments. The system 100 may include a computing system 102 including a machine learning model (MLM) 104. The system 100 may also include a contextual filtering system 106. The computing system 102 and the contextual filtering system 106 may be part of a single computing system or may be implemented separately (as shown in FIG. 1). The computing system 102 and the contextual filtering system 106 may be associated with an MVNO and/or MNO, and/or by a cellular network provider (e.g., a 5G wireless network provider). The MVNO, MNO, and/or cellular network provider may be, at least in part, a cloud-based network provider. This means that one or more network resources and/or functions (e.g., a charging function (CHF), SMS function (SMSF), access and mobility function (AMF) etc.) may be implemented in a distributed, cloud-based architecture.

Similarly, the system 100 may also be implemented in a cloud based architecture. Because the system 100 may be cloud-based, many of the components and functionalities described herein may include software level integrations instead of relying on hardware to perform functions (e.g., filtering gray routed messages). For example, a 5G wireless network provider may provide access to multiple MVNOs, who in turn provide wireless service to users. Each of the MVNOs may utilize one or more virtual networks while sharing some or all hardware components of the 5G wireless network provider. The system 100 (e.g., the computing system 102 and the contextual filtering system 106) may therefore be a shared between the virtual networks. Each of the MVNOs may therefore receive similar functionality (e.g., filtering gray routed messages) without each having an independent system.

The MLM 104 may be a single MLM, or may include one or more MLMs of varying types and/or trained on varying datasets. Thus, the MLM 104 may be understood as a machine learning module, with several capabilities and functionalities. The MLM 104 may include a clustering algorithm (e.g., K-means clustering, DBSCAN-Density based clustering, etc.), Markov chains, long short-term memory (LTSM) networks, geographic information systems geostatistical models, Natural Language Processing (NLP) models, various reinforcement learning models, rules-based systems (e.g., based on a regulation, law, etc.), and other suitable machine learning models and types. The MLM 104 may be trained using data sets including behavioral data of a sender, historical sender data, historical A2P content, historical traffic data, and/or other suitable data. Effectively, therefore, the MLM 104 may identify one or more features of varying types of an A2P message. The contextual filtering system 106 may be similar to that described in application Ser. No. 18/517,356, which is hereby incorporated by reference in its entirety.

In some embodiments, the MLM 104 may include a times series forecasting model (e.g., ARIMA, SARIMA, etc.). The computing system 102 may provide a routing plan for messages routed via the network 119 during an expected high traffic period. For example, the expected high traffic period may be based on historical data, upcoming events, holidays, maintenance windows, etc. The MLM 104 may predict a time window associated with the high traffic period. The MLM 104 may also predict one or more routes to be used by some or all of the network traffic, in order to balance the total network traffic load. Using the information predicted by the MLM 104, the computing system 102 may proactively reroute messages in order to avoid congestion and/or avoid tempting senders to gray-route messages.

At step 103, the computing system 102 may receive an A2P 118 from the sender ID 112 via network 519. The A2P 118 may be an SMS, a multimedia messaging service (MMS) message, a voice communication, or any other such communication. The network 519 may be a cellular network (e.g., a 5G cloud based network), the internet, or other such network. The sender ID 112 may be related to and/or a component of the sender 110. For example, the sender 110 may be a bank, and the sender ID 112 may be a sender ID used for sending one time passcodes (OTPs) to users for dual authentication. In another example, the sender 110 may be a small business using a third-party marketing service to reach customers. The sender ID 112 may be part of a service offering of the third-party marketing service and the A2P 118 may indicate that the A2P 118 is from the small business. Other examples are readily apparent. Although only one A2P 118 is represented, it should be understood that the A2P 118 may represent a plurality of messages, sent to one or more users. The each of the respective messages in the plurality of messages may be identical or may be different from each other.

At step 105 of the process 101, the MLM 104 may determine a score associated with A2P 118. The score may represent a likelihood that the A2P 118 is a gray-routed message. For example, the MLM 104 may determine that the A2P 118 includes content differing from the type of content normally sent in messages from the sender ID 112 and/or the sender 110. The MLM 104 may utilize a large language model to analyze the content, comparing the content to historical messages from the sender 110 and/or to known illegitimate messages. The MLM 104 may additionally or alternatively analyze the content for misspellings, poor grammar, keywords, or other such markers that may indicate that the A2P 118 is an illegitimate message. Furthermore, the MLM 104 may analyze a route used to transmit the A2P 118. The route may include IP addresses, various other wireless networks, foreign entities and other similar parties.

The MLM 104 may additionally or alternatively analyze metadata associated with the A2P 118. The metadata may include an internet protocol (IP) address, routing information (e.g., received from an AMF and/or SMSC), charging information (e.g., a CHF), destination information, and other such information. The MLM 104 may compare the metadata to historical metadata associated with other A2P messages sent by the sender 110 and/or the sender ID 112.

At step 107, the computing system 102 may determine that the A2P 118 is a gray routed message, based at least in part on the score. In determining that the A2P 118 is gray-routed, the computing system 102 may compare the score to a predetermined threshold. For example, the score may represent a confidence interval or likelihood (e.g., 95%). The computing system 102 may determine that the predetermined threshold is 85%. Thus, the computing system 102 may determine that the A2P 118 is a gray-routed message. If, by contrast, the score of the A2P 118 is 60%, the computing system 102 may determine that the A2P is not likely to be a gray routed message. The predetermined thresholds described above are merely examples. The predetermined threshold may be any number (e.g., 10%, 20%, 40%, etc.). Furthermore, the predetermined threshold may be dynamic and based on one or more factors such as a sender, a recipient, a total message volume (e.g., how many similar messages are transmitted), and other such factors. One of ordinary skill in the art would recognize many different possibilities.

At step 109, the computing system 102 may transmit data 120 indicating that the A2P 118 is a gray routed message to the contextual filtering system 106. The data 120 may include the score, data associated with the AP 118 (e.g., metadata, an IP address, sender information, etc.). The computing system 102 may also transmit the A2P 118 itself to the contextual filtering system. In some embodiments, the computing system 102 may not transmit the data 120 and/or the A2P 118 to the contextual filtering system 106. Instead, the computing system 102 may cause the data 120 and/or the A2P 118 to be stored (e.g., in a database). The computing system 102 may additionally or alternatively cause the A2P 118 to be filtered and/or quarantined, not reaching some or all of the intended recipients.

Figure 2:
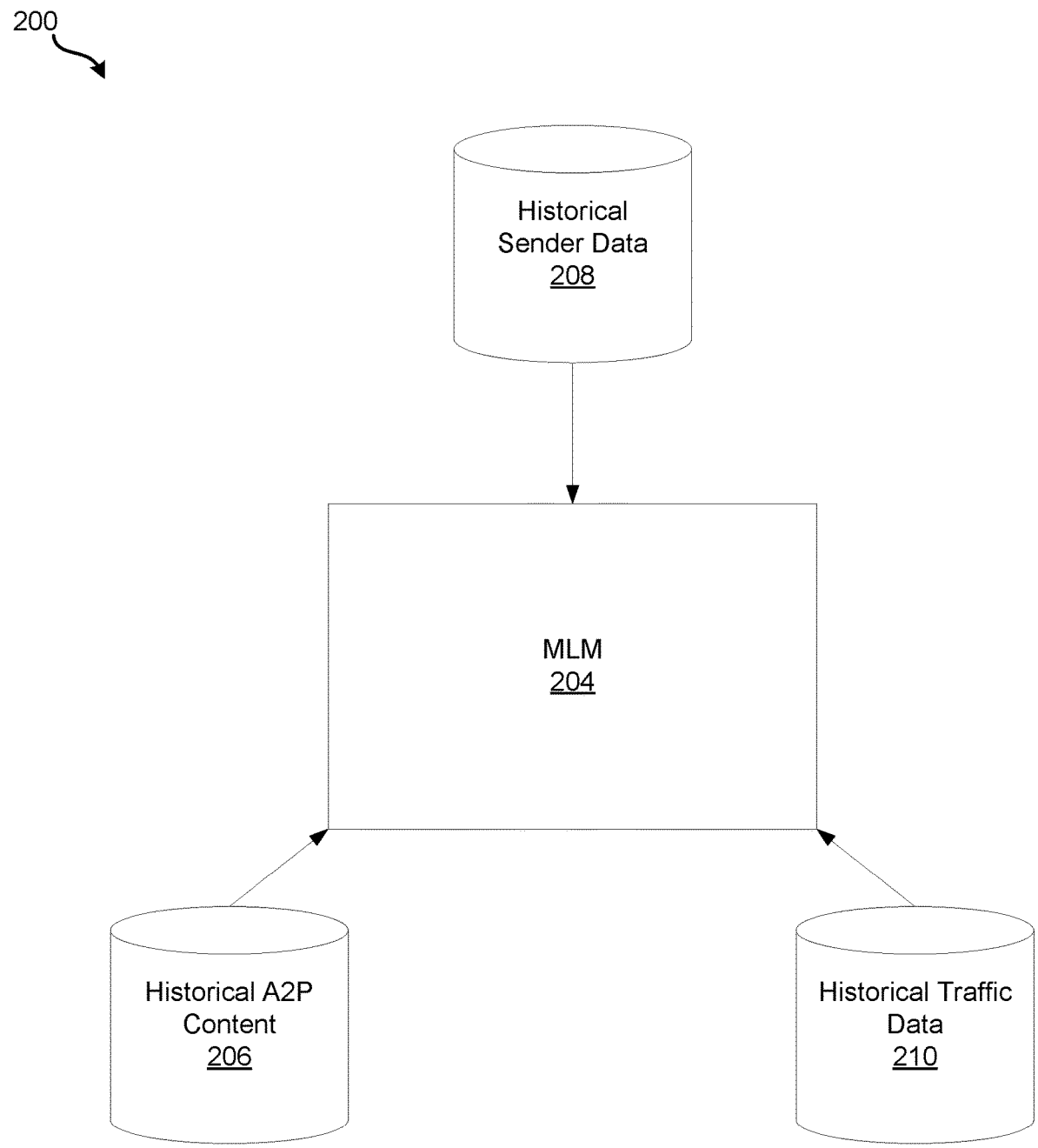
FIG. 2 illustrates a system for training a machine learning model to identify gray routed messages, according to certain embodiments.

FIG. 2 illustrates a system 200 for training a machine learning model 204 to identify gray routed messages, according to certain embodiments. The system 200 may include the MLM 204, and training data 206-210. The training data may include historical A2P content 206, historical sender data 208, and historical traffic data 210. The system 200 may be similar to some or all of the system 100 in FIG. 1, and/or may be used in conjunction with some or all of the system 100. The MLM 204 may be a single MLM, or may include one or more MLMs of varying types and/or trained on varying datasets. Thus, the MLM 204 may be understood as a machine learning module, with several capabilities and functionalities. The MLM 204 may include a clustering algorithm (e.g., K-means clustering, DBSCAN-Density based clustering, etc.) Markov chains, long short-term memory (LTSM) networks, geographic information systems geostatistical models, Natural Language Processing (NLP) models, various reinforcement learning models, rules-based systems, and other suitable machine learning models and types.

The historical A2P content 206 may include data indicating the content of A2P messages sent by a particular sender. The historical A2P content 206 may include copies of historical A2P messages, or may include some or all of the message content. The historical A2P content 206 may include information associated with the content of both legitimate and gray-routed A2P messages. The legitimate historical A2P messages associated with the particular sender may be of a certain type. For example, the legitimate historical A2P messages associated with the particular sender may be verification messages, promotional messages, or some other message type. The legitimate historical A2P messages may additionally have similar spelling, grammar, language, etc. A gray-routed A2P message may contain certain misspellings, grammatical patterns, language, and/or other aspects that may be common to illegitimate messages. For example, a phishing message may contain "URGENT" at the beginning of the message. By legitimate historical A2P messages and illegitimate historical A2P messages in the historical A2P content 206, the MLM 204 may thus be trained to recognize aspects of an A2P message's content that may be illegitimate. As illegitimate messages evolve and are identified (either by a system such as the system 100 and/or user inputs), the historical A2P content 206 may be updated accordingly. As an illegitimate A2P message may be more likely to be gray-routed, identifying illegitimate messages may improve performance of identifying gray-routed messages and related senders.

The MLM 204 may also be trained on the historical sender data 208. The historical sender data 208 may include data associated with a particular sender of A2P messages (e.g., the sender 110 in FIG. 1) and/or and sender ID (e.g., the sender ID 112 in FIG. 1). The historical sender data 208 may therefore include information such as a normal A2P message type (e.g., SMS, MMS, etc.) and other data associated with the particular sender. For example, the particular sender may typically send SMS messages. In another example, the historical sender data 208 may be associated with the historical A2P content 206. Thus, the historical sender data 208 may be associated with certain content features, such as promotional language, OTP messages, a link to a webpage and/or other such features. The historical sender data 208 may also include typical metadata associated with the particular sender, such as IP addresses, routing information, wireless network information including network function information (e.g., CHF information), and other such information. The historical sender data 208 may also include a third party trust score, maintained by a third party (e.g., The Campaign Registry). The third party trust score may be associated with the sender and/or the sender ID. The MLM 204 may utilize the historical sender data 208 to further identify potential illegitimate A2P messages, and thereby potential gray-routed A2P messages.

The MLM 204 may also be trained on historical traffic data 210. The historical traffic data 210 may include information associated with the A2P messaging traffic of the particular sender and/or the network through which A2P messages are received. The information associated with the A2P messaging traffic may include a time window (e.g., a normal time the sender transmits A2P messages), a message volume, message length, IP range of the sender (e.g., IP addresses from which A2P messages are received), message encoding formats, and other data related to the transmissions of A2P messages. The MLM 204 may therefore be trained to identify unusual messaging patterns. Messages received via the unusual messaging patterns may be more likely to be gray routed. Thus, the MLM 204 may flag messages received via the unusual messaging patterns for further analysis (and/or as gray-routed messages).

The MLM 204 may also be trained using sender behavioral data 212. The sender behavioral data 212 may include information about one or more senders, either individually or as a cohort. The information may include a normal A2P message (e.g., a promotional message), a reporting rate (e.g., how often a user reports a message as spam etc.), location information, and other such information. A cohort (or group of users) may include multiple users with a common trait such as an account type, an organizational association (e.g., employees of a company), a location, a subscription status (e.g., subscribed to an MVO or MVNO), and other such traits. In other words, the cohort may be clustered by their behaviors and/or associations. The MLM 204 may perform the clustering and analysis thereof (e.g., via k-means clustering and/or a similar technique or method), or the clustering may be performed by some other system. The MLM 204 may also be trained on other datasets not shown, but providing more context to the filtering of A2P messages.

Figure 3:
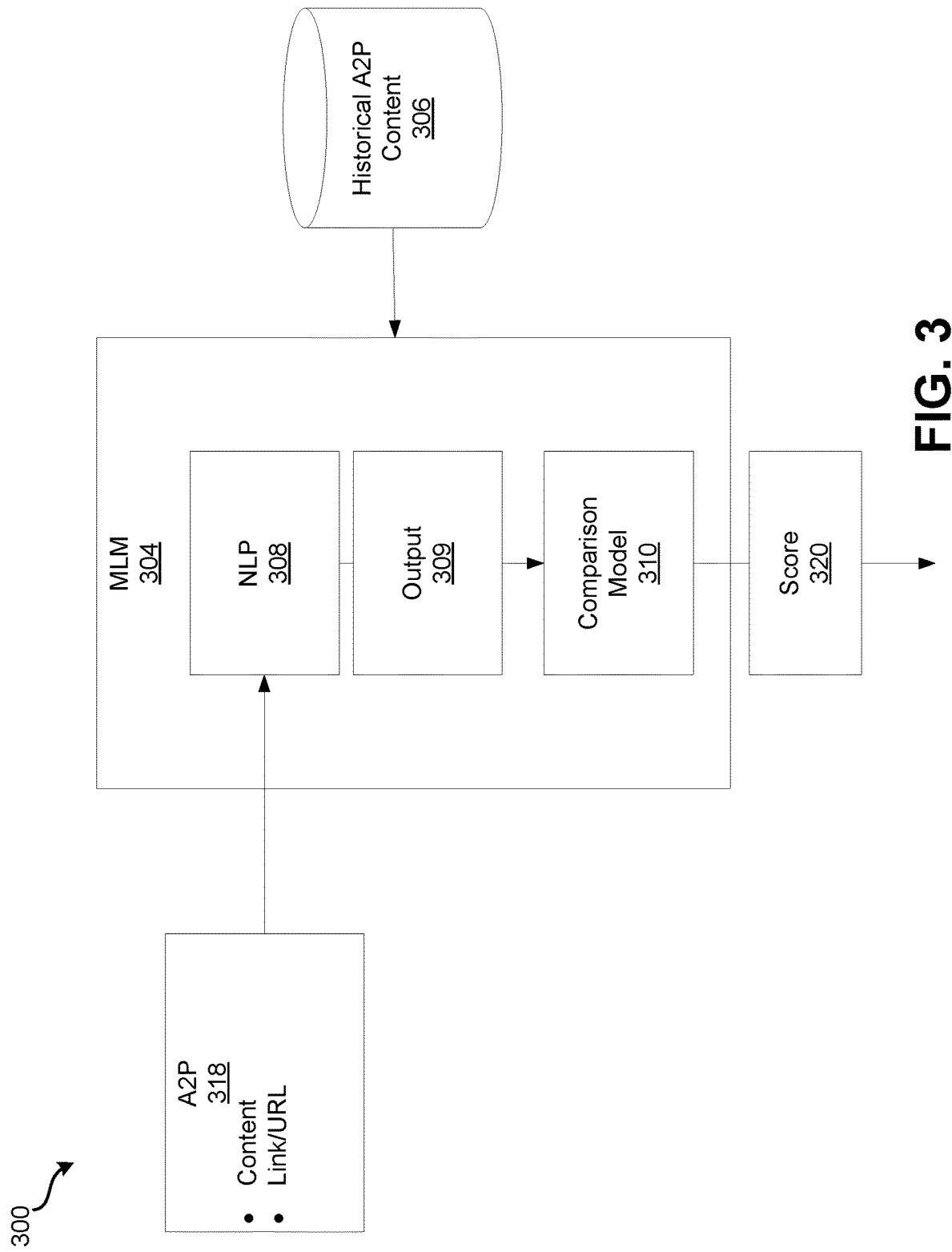
FIG. 3 illustrates a system for analyzing message content of an A2P message, according to certain embodiments.

FIG. 3 illustrates a system 300 for analyzing message content of an A2P message 318, according to certain embodiments. The system 300 may include an MLM 304, a natural language processing module (NLP) 308, and a comparison module 310. The MLM 304 may be trained, at least in part, using historical A2P content 306. The historical A2P content 306 may be similar to the historical A2P content 206 in FIG. 2. Thus, the historical A2P content may include copies of historical A2P messages, or may include some or all of the message content. The historical A2P content 306 may include information associated with the content of both legitimate and gray-routed A2P messages. The MLM 304 may be similar to some or all of the MLM 204 in FIG. 2. For example, the MLM 304 may include one or more different machine learning models, such as the NLP 308. The MLM 304 may be included in a computing system such as the computing system 102 in FIG. The computing system (and therefore the MLM 304) may in turn be included in a system for contextually determining illegitimate A2P messages, including gray-routed messages.

The MLM 304 may receive an A2P 318. The A2P 318 may be similar to the A2P 118 in FIG. 1. The A2P 218 may be an SMS, a multimedia messaging service (MMS) message, a voice communication, or any other such communication. The A2P 318 may include one or more characteristics, such as message content. The message content may include language, a link/URL, an image, or any other such content. The message content may be analyzed using the NLP 308. The NLP 308 may determine that the some or all of the message content is associated with spam (e.g., the content contains typical spam indicators). For example, the message content may include promotional content, or certain key words (e.g., urgent, fast, now, etc.) that may indicate a spam or phishing message. The NLP 308 determine individual words from the message content and/or may analyze the entire message content to determine a context for the individual words. The NLP 308 may additionally or alternatively analyze the content for misspellings, poor grammar, keywords, or other such markers that may indicate that the A2P 318 is an illegitimate message. Additionally or alternatively, the MLM 304 (using the NLP 308 and/or another machine learning module) may analyze an included URL or link. The MLM 304 may determine that the included URL or link is frequently associated with spam (or other illegitimate messages) based on the text of the link and/or a destination (e.g., an IP address) embedded in the URL or link.

The NLP 308 may then transmit an output 309 to a comparison model 310. The output 309 may include data indicating information about the message content of the A2P 318. For example, the output 309 may include a language of the message content, grammatical patterns, some or all of the individual words used in the message content. The output 309 may also include information about the included URL or link. The comparison model 310 may compare some or all of the data included in the historical A2P content 306. For example, the A2P 318 may be received from a particular sender. The comparison model 310 may then access historical A2P content associated with the particular sender. If the message content differs from the typical A2P content associated with the particular sender over a certain threshold, the MLM 304 may determine that the A2P is likely an illegitimate message and thus likely to be gray-routed. In some embodiments, some or all of the functions of the comparison model 310 may be performed by the NLP 308.

Based on the output 309 and/or results from the comparison model, the MLM 304 may assign a score 320 associated with the A2P 318. The score may represent a likelihood that the A2P 118 is an illegitimate and/or gray-routed message based on the message content of the A2P 318. The message 318 and/or the score 320 may then be transmitted to the computing system and/or to a contextual filtering system such as the contextual filtering system 106 in FIG. 1. The output 309 may additionally or alternatively be provided to the historical A2P content 306.

Figure 4:
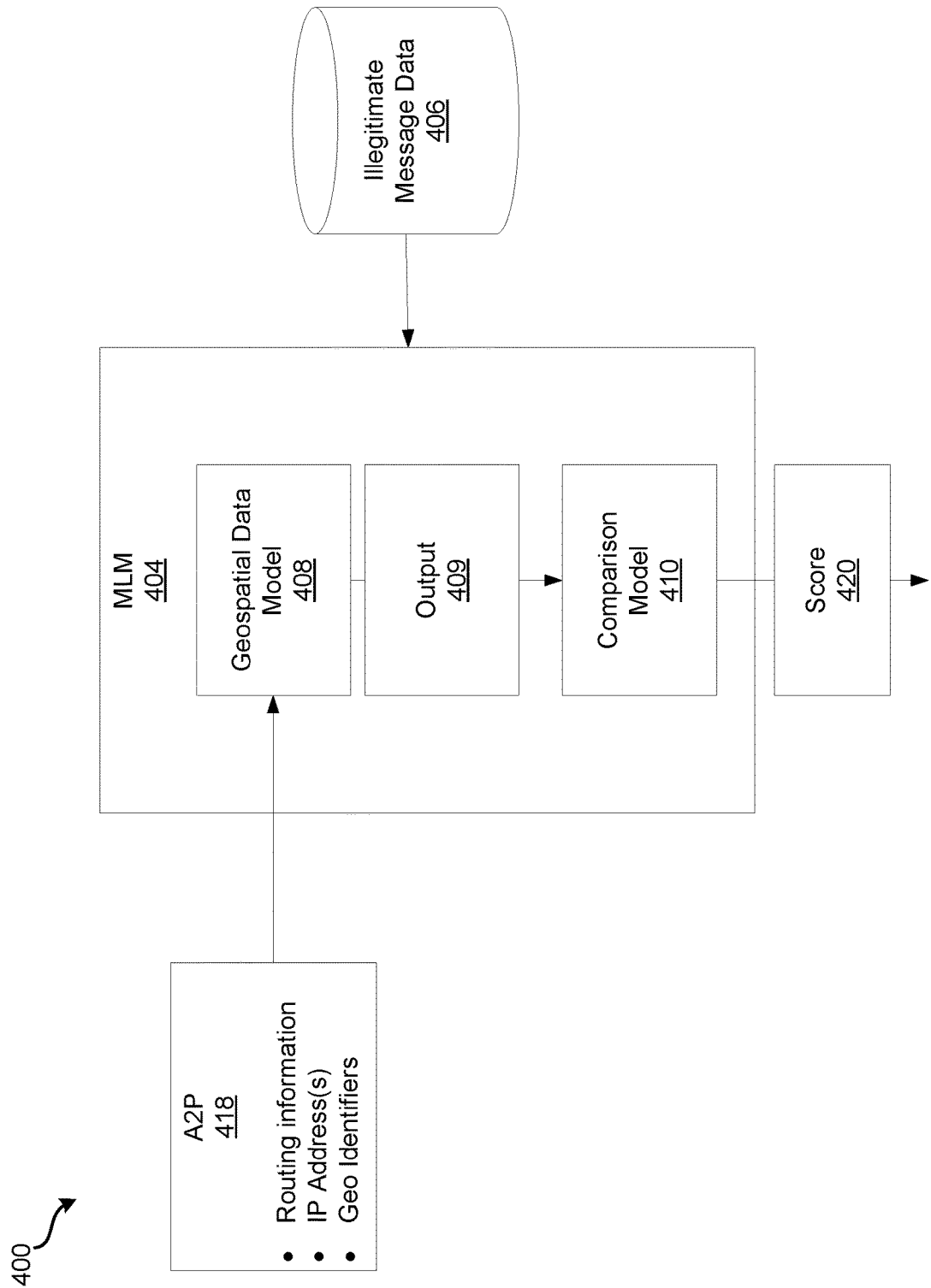
FIG. 4 illustrates a system for performing geographical analysis on an A2P message, according to certain embodiments.

FIG. 4 illustrates a system 400 for performing geographical analysis on an A2P message 418, according to certain embodiments. The system 400 may include an MLM 404, a geospatial data model (GDM) 408, and a comparison module 410. The MLM 404 may be similar to some or all of the MLM 104 in FIG. 1. For example, the MLM 104 may include one or more different machine learning models, such as the GDM 408. The MLM 404 may operate separately and/or in conjunction with the MLM 304 in FIG. 3. The MLM 404 may be included in a computing system such as the computing system 102 in FIG. The computing system (and therefore the MLM 404) may in turn be included in a system for contextually determining illegitimate A2P messages, including gray-routed messages. The GDM 408 may be trained to perform geospatial data analysis. For example, the GDM 408 may utilize a geographical information system (GIS), one or more geostatistical models, and/or other suitable models.

The MLM 404 may be trained, at least in part, using illegitimate message data 406. The illegitimate message data 406 may include geographical information typical of gray-routed messages. For example, certain countries may be associated with gray-routed messages due to associated laws in those countries. The illegitimate message data 406 may therefore include information such as IP addresses, country codes, and other identifiers that may flag an A2P as being routed through that country. The illegitimate message data 406 may also include information that indicates typical routes and lengths (e.g., how many and which countries/nodes an A2P is routed through). The illegitimate message data 406 may also include information associated with a particular sender of the A2P 418. For example, the illegitimate message data 406 may include data that indicates that the particular sender typically sends A2P messages from the United States.

The MLM 404 may receive the A2P 418. The A2P 418 may be similar to the A2P 118 in FIG. 1 and/or the A2P 318 in FIG. 3. The A2P 418 may be a different aspect of the A2P 318 in FIG. 3. The A2P 418 may include geographical characteristics such as routing information associated with the A2P 418, IP address(es) associated with the route by which the A2P 418 was transmitted, other geographical identifiers, and/or other geographical information. The GDM 408 may analyze some or all of the geographical characteristics included in the A2P 418 to determine a route, a likely source, and other such information. For example, the GDM 408 may determine that the A2P 418 originates from Romania by analyzing one or more of the IP addresses included in the geographical characteristics. The GDM may also determine that the A2P 418 appears to originate from the United States via spoofing or other such techniques. The GDM 408 may additionally or alternatively identify a likely route of the A2P 418 using the IP address(es) and/or the routing information. For example, the GDM 408 may determine that the A2P 418 likely was routed through 12 nodes in 10 countries. The GDM 408 may also identify one or more of the 10 countries.

The GDM 408 may then transmit an output 409 to the comparison model 410. The output 409 may include the origination country of the A2P 418, the routing information (e.g., route path and length), and other such geographical information. In some embodiments, the comparison model 410 may access the illegitimate message data 406 and compare the data included in the output 409 to the illegitimate message data 406. For example, the illegitimate message data 406 may indicate that the particular sender associated with the A2P 418 typically originates A2P messages from the United States. The comparison model 410 may then determine that although the A2P 418 appears to originate from the Untied States, the A2P actually originates from Romania. In some embodiments, some or all of the functions of the comparison model 410 may be performed by the GDM 408.

Based on the output 409 and/or results from the comparison model 410, the MLM 404 may assign a score 420 associated with the A2P 418. The score may represent a likelihood that the A2P 118 is an illegitimate and/or gray-routed message based on the message content of the A2P 418. The message 418 and/or the score 420 may then be transmitted to the computing system and/or a contextual filtering system such as the contextual filtering system 106 in FIG. 1. The output 409 may additionally or alternatively be provided to the illegitimate message data 406.

Figure 5:
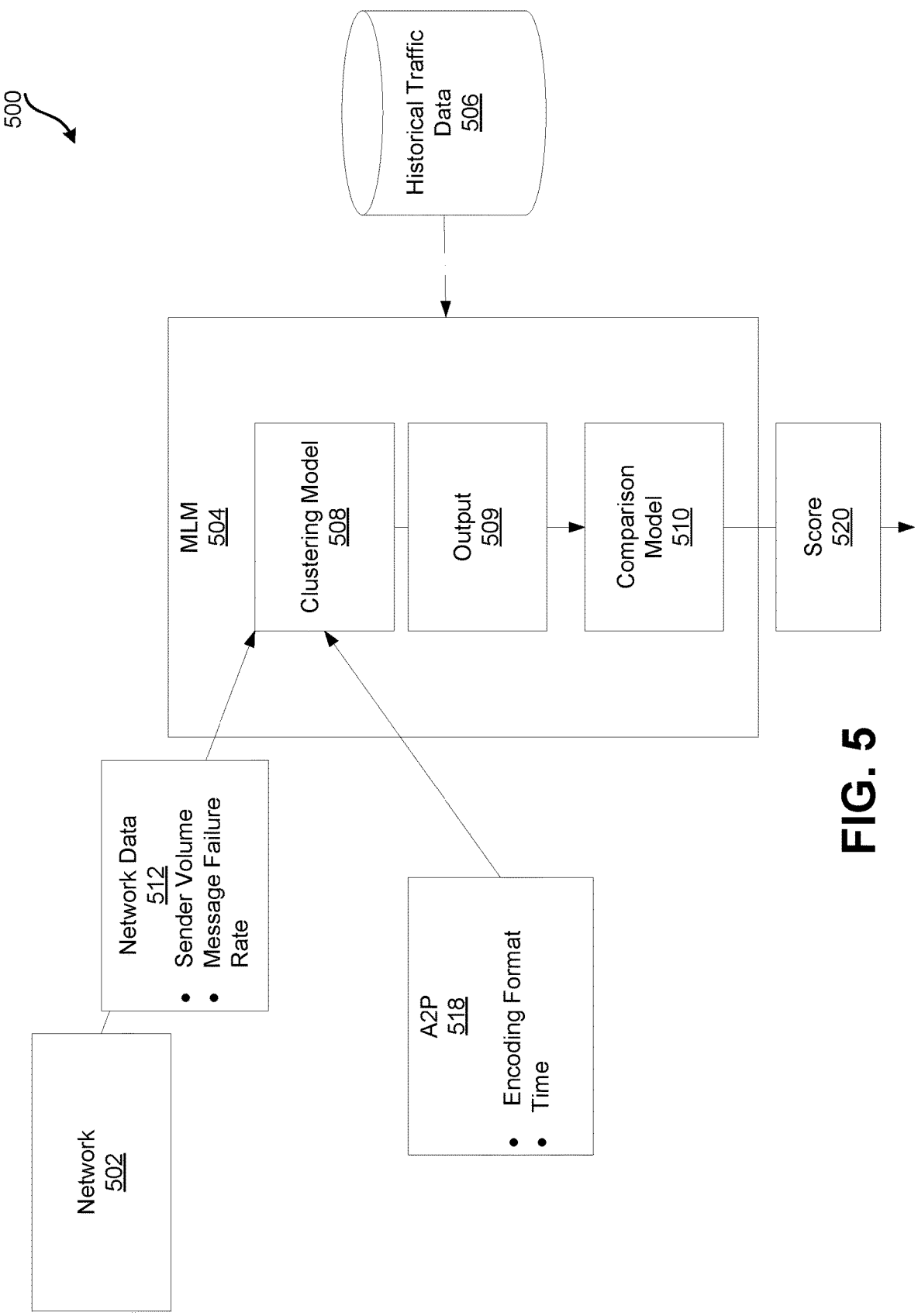
FIG. 5 illustrates a system for performing traffic clustering with network data and an A2P, according to certain embodiments.

FIG. 5 illustrates a system 500 for performing traffic clustering with network data 512 and an A2P 518, according to certain embodiments. The system 500 may include a network 502, an MLM 504, and historical traffic data 506. The MLM 504 may include a clustering model 508 and a comparison model 510. The MLM 504 may be similar to some or all of the MLM 104 in FIG. 1. For example, the MLM 104 may include one or more different machine learning models, such as the clustering model 508. The MLM 504 may operate separately and/or in conjunction with the MLM 304 in FIG. 3 and/or the MLM 404 in FIG. 4. The MLM 504 may be included in a computing system such as the computing system 102 in FIG. The computing system (and therefore the MLM 504) may in turn be included in a system for contextually determining illegitimate A2P messages, including gray-routed messages. The clustering model 508 may be trained determine network traffic patterns associated with the network 502 and/or a particular sender of the A2P 518. The clustering model may include K-means clustering algorithms, DBSCAN-Density based clustering (with noise), and other such models.

The MLM 504 may be trained using the historical traffic data 506. The historical traffic data 506 may include information associated with the A2P messaging traffic of the particular sender (e.g., of the A2P 518) and/or the network 502. The information associated with the A2P messaging traffic may include a time window (e.g., a normal time the particular sender transmits A2P messages), a message volume, a failure rate of the network 502 and/or the particular sender, an IP range of the particular sender (e.g., IP addresses from which A2P messages are received), message encoding formats, and other data related to the transmissions of A2P messages. The MLM 504 may therefore be trained to identify unusual messaging patterns. A2P received via the unusual messaging patterns may be more likely to be gray routed. Thus, the MLM 204 may flag messages received via the unusual messaging patterns for further analysis (and/or as gray-routed messages).

The MLM 504 may receive the network data 512 from the network 502. The MLM 504 may receive the network data 512 by directly monitoring the network 502, or may receive the network data 512 from an intermediary device (e.g., a network monitor). The network data 512 may include general network information, such as a total network traffic volume, percent capacity, and other such network information. The network data 512 may also include network information associated with the particular sender of the A2P 518. The network information may include a current sender volume (e.g., how many messages the particular sender is transmitting in a given time window), a message failure rate, and other such information. The MLM 504 may also receive the A2P 518. The A2P 518 may include a time at which the A2P 518 was transmitted and/or received, an encoding format (e.g., SMS, MMS, voice, etc.), and other network-related information.

The clustering model 508 may analyze some or all of the network data 512 and/or the information included in the A2P 518. For example, the clustering model 508, may determine that a number of message failures in the network 502 is higher than normal and clustered together in one or more time windows. The clustering model 508 may then determine that a percentage of the message failures stem from the particular sender of the A2P 518. If the percentage is above a certain threshold, the clustering model 508 may flag the A2P 518 and/or the particular sender as likely illegitimate (and/or as transmitting gray-routed messages). In another example, the clustering model 508 may determine that the network 502 is experiencing a spike in A2P messages from a particular IP address. The spike may be in an acute time window (e.g., an hour, a minute, etc.), or may be over a longer time window (e.g., 6 hours, a day, etc.). The clustering model 508 may link the individual messages of the spike, and determine that the spike is an unusual network traffic pattern. In yet another example, the clustering model 508 may determine that the network 502 is experiencing messages with inconsistent message encoding formats. The inconsistent message encoding formats may indicate that the particular sender is attempting to bypass traditional filters to transmit A2P messages (e.g., the A2P 518).

The clustering model 508 may then transmit an output 509 to the comparison model 510. The output 509 may include data that indicates that A2P 518 is likely an illegitimate message and/or is gray-routed. In some embodiments, the clustering model 510 may access the historical traffic data 506 and compare some or all of the information therein to the data included in the output 509. For example, the output 509 may indicate a time window associated with a spike in network traffic. The comparison model 510 may then determine that the spike occurs outside of a typical time window. The comparison model 510 may then flag some or all of the messages as likely to be illegitimate and/or gray routed. In some embodiments, some or all of the functions of the comparison model 510 may be performed by the clustering model 508.

Based on the output 509 and/or results from the comparison model 510, the MLM 505 may assign a score 520 associated with the A2P 518 and/or the particular sender. The score may represent a likelihood that the A2P 118 is an illegitimate and/or gray-routed message based on the message content of the A2P 518. The message 518 and/or the score 520 may then be transmitted to the computing system and/or to a contextual filtering system such as the contextual filtering system 106 in FIG. 1. The output 509 may additionally or alternatively be provided to the illegitimate message data 506.

Figure 6:
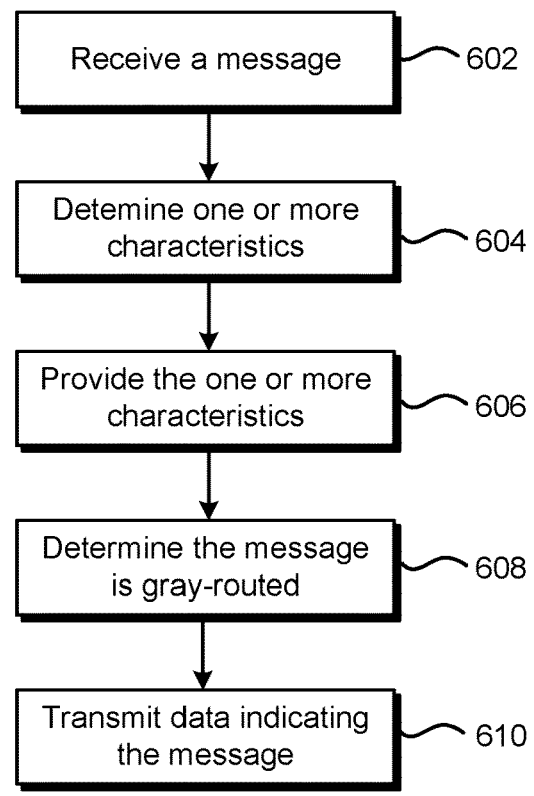
FIG. 6 illustrates a flowchart of a method for detecting gray routed messages, according to certain embodiments.

FIG. 6 illustrates a flowchart of a method 600 for detecting gray routed messages, according to certain embodiments. The method 600 may be performed by any or all of the systems described herein, alone or in conjunction with one another. Some of the steps of the method 600 may be performed in an order different than that described here, and/or may be combined with other steps. In some embodiments, some steps may be skipped altogether.

At step 602, the method 600 may include receiving, by a computing system, a message from a sender via a network. The message may be an A2P message, such as the A2P 118 in FIG. 1. The message may be an SMS, a multimedia messaging service (MMS) message, a voice communication, or any other such communication. The network may be a cellular network (e.g., a 5G cloud based network), the internet, or other such network. The message may also include a sender ID, related to and/or a component of a sender. For example, the sender may be a bank, and the sender ID may be a sender ID used for sending one time passcodes (OTPs) to users for dual authentication. In another example, the sender may be a small business using a third-party marketing service to reach customers. The sender ID may be part of a service offering of the third-party marketing service and the message may indicate that the message from the small business.

At step 604, the method 600 may include determining, by the computing system, one or more characteristics of the message. The one or more characteristics may include message meta data, geographical data, message content, traffic data, and other such data. In some embodiments, the one or more characteristics may be indicated in individual transmissions of data (e.g., files). In other embodiments, the computing device may flag or otherwise indicates certain characteristics for further processing.

At step 606, the method 600 may include providing, by the computing system, the one or more characteristics to an MLM, the MLM configured to assign a score to the message based at least in part on the one or more characteristics of the message. The MLM may include one or more machine learning models, trained on one or more data sets. For example, the MLM may include an MLM for analyzing message content such as the MLM 304 in FIG. 3. The MLM may also include an MLM for analyzing the geographical characteristics of the message, such as the MLM 404 in FIG. 4. The MLM may also include an MLM for analyzing traffic data associated with the message and/or the network, such as the MLM 504 in FIG. 5. As such the MLM may be trained using data sets such as those described in FIGS. 2-5. The score may represent a confidence interval or likelihood (e.g., 95%) that the message is an illegitimate message and/or is gray routed. The computing device may receive scores from one or more MLMs (e.g., the MLMs 304, 404, and 504). The computing device may then combine the scores to form a combined score.

At step 608, the method 600 may include determining, by the computing system, that the message is a gray-routed message based at least in part on the score assigned to the message. The computing device may compare the score(s) to a predetermined threshold. The predetermined threshold may be any number (e.g., 10%, 20%, 40%, etc.). Furthermore, the predetermined threshold may be dynamic and based on one or more factors such as a sender, a recipient, a total message volume (e.g., how many similar messages are transmitted), and other such factors. The computing device may then compare the score (e.g., the combined score from above) to the predetermined threshold. If the score is greater than the predetermined threshold, the computing system may determine that the message is likely a gray-routed message and/or an illegitimate message.

Based on a determination that the message is a gray-routed message, at step 608, the method 600 may include transmitting, by the computing system, data indicating the message, the one or more characteristics of the message, and/or the sender to a contextual filtering system. The contextual filtering system may be configured to identify and filter illegitimate and/or gray-routed messages from the network. The contextual filtering system may be a component of the computing system or may be a separate computing system. The contextual filtering system may be associated with a 5G wireless network provider.

In some embodiments, the one or more characteristics may include data associated with the content of the message. The MLM may include a natural language processing model (e.g., the NLP 308). Then, the method 600 may include determining, by the machine learning module, that the content of the message includes indicators associated with illegitimate messages (e.g., typical spam indicators, promotional language, etc.). The method 600 may the include comparing, by the machine learning module, the content of the message to typical content of other messages transmitted by the sender. The method may include generating, by the machine learning model, the score for the message based at least in part on the indicators associated with the illegitimate messages and the comparison of the content of the message to the typical message.

In some embodiments, the one or more characteristics may include geographical data associated with the message. The MLM may include a geospatial data analysis model (e.g., the GDM 408). Then, the method 600 may include determining, by the machine learning model, that the geographical data is associated with gray-routed messages. The method 600 may also include generating, by the machine learning model, the score for the message based at least in part on the determination that the geographical location is associated with gray routed messages.

In some embodiments, the one or more characteristics may include network information. The MLM may include a clustering model. Then, the method 600 may include determining, by the machine learning model, that the network information of the message is atypical. The method may also include generating, by the machine learning model, the score for the message based at least in part on the determination that the network information of the message is atypical.

In some embodiments, the computing device may receive data indicating an accuracy rating of the score assigned to the message. The computing device may then provide the message and the data indicating the accuracy rating of the score to the machine learning model such that the machine learning model is retrained based at least in part on the message and the accuracy rating of the score. The computing device may then store the message and/or the data indicating the accuracy rating of the score in a historical dataset. For example, the outputs 309, 409, and 509 may be individually assigned an accuracy rating. The outputs 309, 409, and 509 and respective accuracy ratings may then be used to retrain the MLM(s).

Figure 7A:
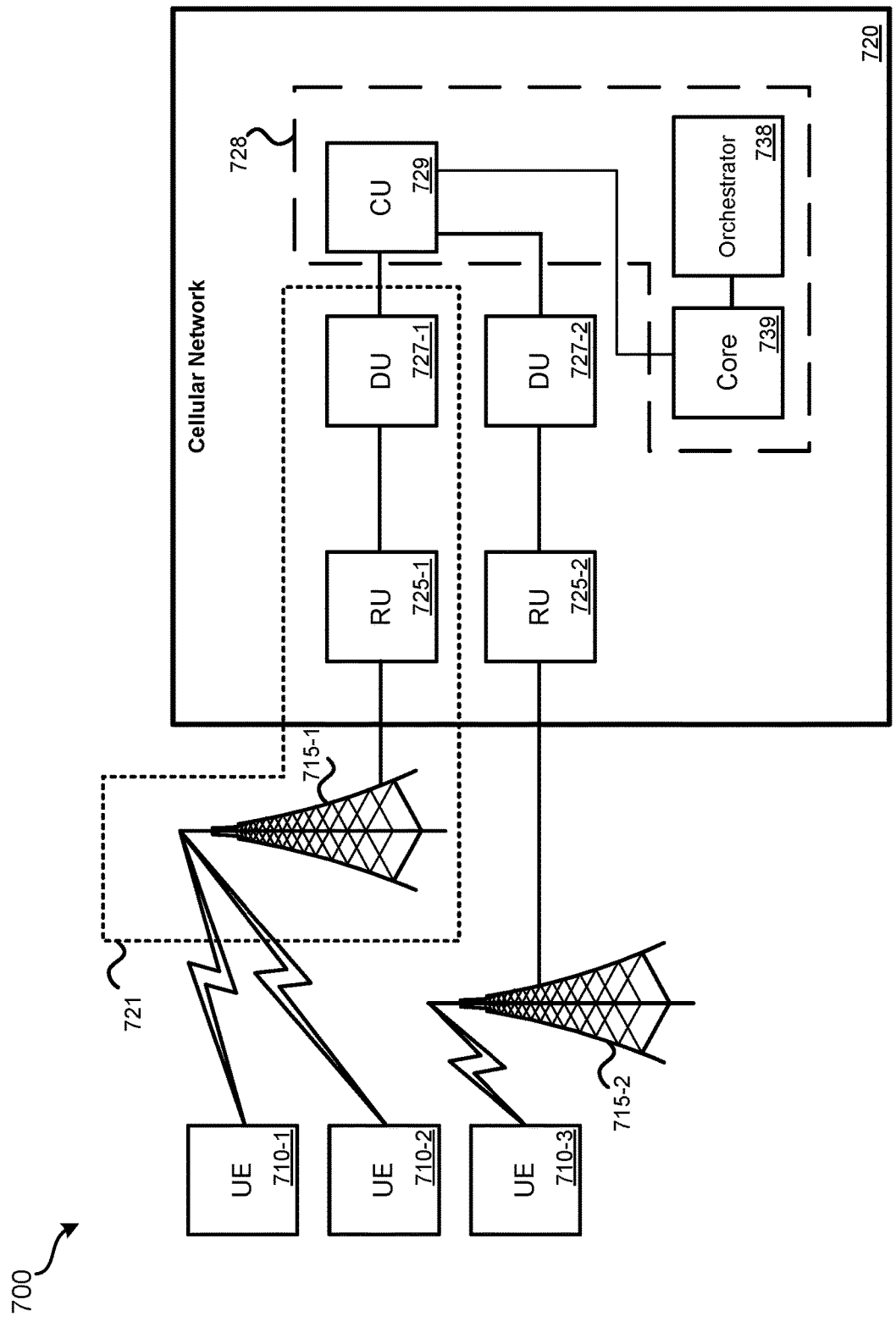
FIG. 7A illustrates an embodiment of a cellular network system, according to certain embodiments.

FIG. 7A illustrates an embodiment of a cellular network system 700 ("system 700"), according to certain embodiments. System 700 can include a fifth generation (5G) New Radio (NR) cellular network; other types of cellular networks, such as fourth generation (4G) long-term evolution (LTE) cellular network, sixth generation (6G) cellular network, seventh generation (7G) cellular network, etc. are also possible. System 700 can include: UE 710 (UE 710-1, UE 710-2, UE 710-3); base station 715; cellular network 720; radio units 725 ("RUs 725"); distributed units 727 ("DUs 727"); centralized unit 729 ("CU 729"); core 739, and orchestrator 738. FIG. 7A represents a component level view. In a virtualized open radio access network (O-RAN), because components can be implemented as software in the cloud, except for components that receive and transmit RF, the functionality of various components can be shifted among different servers, for which the hardware may be maintained by a separate (e.g., public) cloud-service provider, to accommodate where the functionality of such components is needed, such as detailed in relation to FIG. 8.

UE 710 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a cellular (e.g., 5G) interface, such as a 5G modem. Examples include sensor devices, Internet of Things (IoT) devices, manufacturing robots; unmanned aerial (or land-based) vehicles, network-connected vehicles, environmental sensors, etc. UE 710 may use RF to communicate with various base stations of cellular network 720. Two base stations 715 (BS 715-1, 715-2) are illustrated. Real-world implementations of system 700 can include many (e.g., hundreds, thousands) base stations, and many RUs, DUs, and CUs. BS 715 can include one or more antennas that allow RUs 725 to communicate wirelessly with UEs 710. RUs 725 can represent an edge of cellular network 720 where data is transitioned to wireless communication. In some implementations, the radio access technology (RAT) used by RU 725 is 5G New Radio (NR). Other implementations use other RAT, such as 4G Long Term Evolution (LTE). The remainder of cellular network 720 may be based on an exclusive 5G architecture, a hybrid 4G/5G architecture, a 4G architecture, or some other cellular network architecture. Base station equipment 721 may include an RU (e.g., RU 725-1) and a DU (e.g., DU 727-1) located on site at the base station. In some embodiments, the DU may be physically remote from the RU. For instance, multiple DUs may be housed at a central location and connected to geographically distant (e.g., within a couple of kilometers) RUs.

One or more RUs, such as RU 725-1, may communicate with DU 727-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, "band 71" (a radiofrequency band near 600 Megahertz allocated for cellular communications). One or more DUs, such as DU 727-1, may communicate with CU 729. Collectively, RUs, DUs, and CUs create a gNodeB, which serves as the radio access network (RAN) of cellular network 720. CU 729 can communicate with core 739. The specific architecture of cellular network 720 can vary by embodiment. Edge cloud server systems outside of cellular network 720 may communicate, either directly, via the Internet, or via some other network, with components of cellular network 720. For example, one or more DUs 727-1 may be able to communicate with an edge cloud server system without routing data through CU 729 or core 739.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 7B:
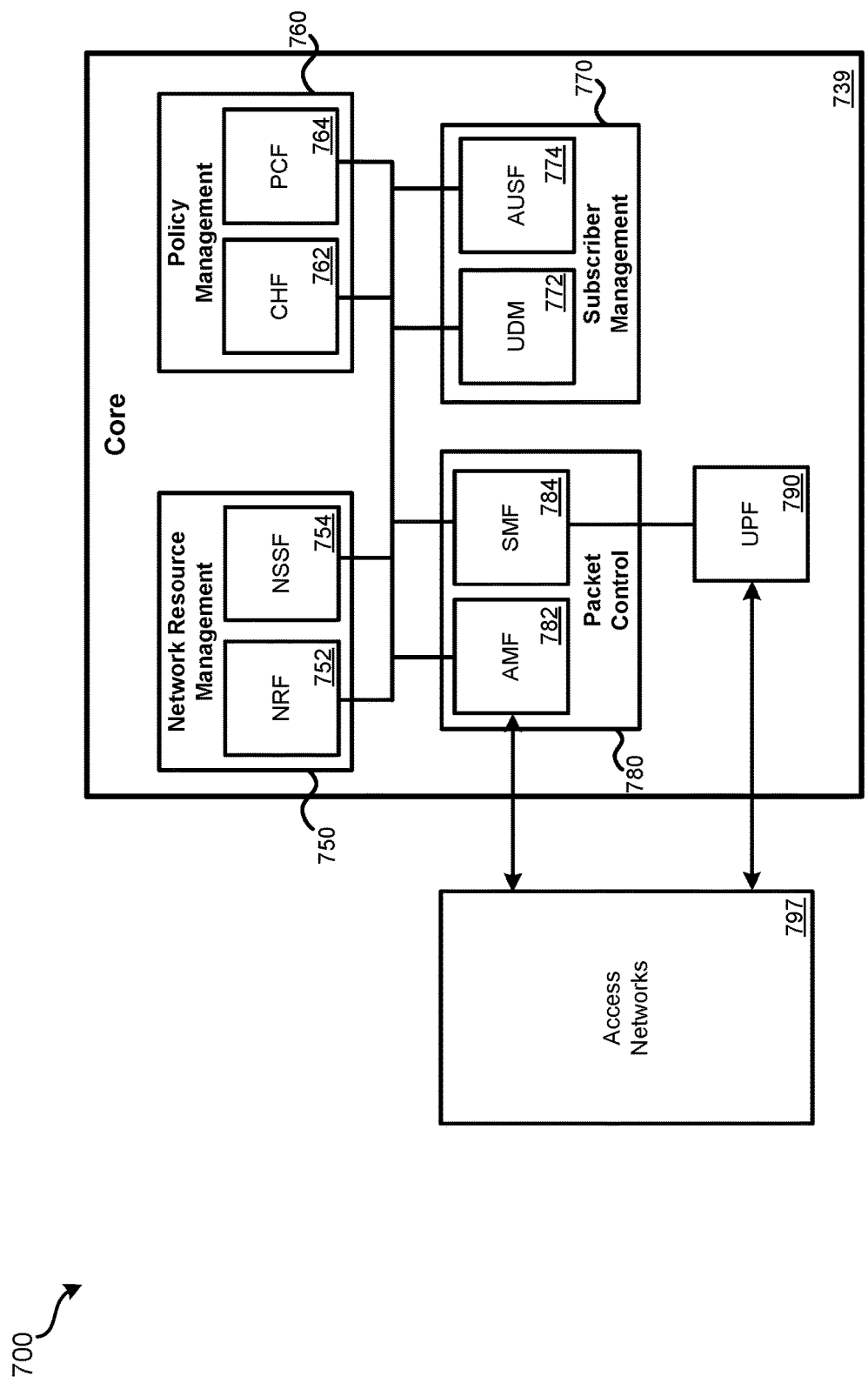
FIG. 7B illustrates an exemplary core, according to certain embodiments.

Further detail regarding exemplary core 739 is provided in relation to FIG. 7B. FIG. 7B illustrates an exemplary core 739, according to certain embodiments. The exemplary core 739 can be physically distributed across data centers or located at a central national data center (NDC), such as detailed in relation to FIG. 8, can perform various core functions of the cellular network. Core 739 can include: network resource management components 750; policy management components 760; subscriber management components 770; and packet control components 780. Individual components may communicate via a bus, thus allowing various components of core 739 to communicate with each other directly. Core 739 is simplified to show some key components. Implementations can involve additional components.

Network resource management components 750 can include: Network Repository Function (NRF) 752 and Network Slice Selection Function (NSSF) 754. NRF 752 can allow 5G network functions (NFs) to register and discover each other via a standards-based application programming interface (API). NSSF 754 can be used by AMF 782 to assist with the selection of a network slice that will serve a particular UE (e.g., UEs 710 of FIG. 7A).

Policy management components 760 can include: Charging Function (CHF) 762 and Policy Control Function (PCF) 764. CHF 762 allows charging services to be offered to authorized network functions. Converged online and offline charging can be supported. PCF 764 allows for policy control functions and the related 5G signaling interfaces to be supported.

Subscriber management components 770 can include: Unified Data Management (UDM) 772 and Authentication Server Function (AUSF) 774. UDM 772 can allow for generation of authentication vectors, user identification handling, NF registration management, and retrieval of UE individual subscription data for slice selection. AUSF 774 performs authentication with UEs.

Packet control components 780 can include: Access and Mobility Management Function (AMF) 782 and Session Management Function (SMF) 784. AMF 782 can receive connection- and session-related information from UEs and is responsible for handling connection and mobility management tasks. SMF 784 is responsible for interacting with the decoupled data plane, creating updating and removing Protocol Data Unit (PDU) sessions, and managing session context with the User Plane Function (UPF).

User plane function (UPF) 790 can be responsible for packet routing and forwarding, packet inspection, quality of service (QOS) handling, and external PDU sessions for interconnecting with a Data Network (DN) (e.g., the Internet) or various access networks 797. Access networks 797 can include the RAN of cellular network 720 of FIG. 7A.

While FIGS. 7A and 7B illustrate various components of cellular network 720, it should be understood that other embodiments of cellular network 720 can vary the arrangement, communication paths, and specific components of cellular network 720. While RU 725 may include specialized radio access componentry to enable wireless communication with UE 710, other components of cellular network 720 may be implemented using either specialized hardware, specialized firmware, and/or specialized software executed on a general-purpose server system. In a virtualized arrangement, specialized software on general-purpose hardware may be used to perform the functions of components such as DU 727, CU 729, and core 739. Functionality of such components can be co-located or located at disparate physical server systems. For example, certain components of core 739 may be co-located with components of CU 729.

Returning to FIG. 7A, some O-RAN implementations of the DUs 727, CU 729, core 739, and/or orchestrator 738 are implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 700, cloud-based cellular network components A128 include CU 729, core 739, and orchestrator 738. In some embodiments, DUs 727 may be partially or fully added to cloud-based cellular network components 728. Such cloud-based cellular network components 728 may be executed as specialized software executed by underlying general-purpose computer servers. Cloud-based cellular network components 728 may be executed on a public third-party cloud-based computing platform or a cloud-based computing platform operated by the same entity that operates the RAN. A cloud-based computing platform may have the ability to devote additional hardware resources to cloud-based cellular network components 728 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits, as needed, for the cellular network 720 to function properly. Kubernetes allows for container deployment, scaling, and management. As an example, if cellular traffic increases substantially in a region, an additional logical DU or components of a DU may be deployed in a data center near where the traffic is occurring without any new hardware being deployed; rather, processing and storage capabilities of the data center would be devoted to the needed functions. When the need for the logical DU or subcomponents of the DU no longer exists (i.e., when traffic subsequently decreases), Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 738. Orchestrator 738 can represent various software processes executed by underlying computer hardware. Orchestrator 738 can monitor cellular network 720 and determine the amount and location at which cellular network functions should be deployed to meet or attempt to meet service level agreements (SLAs) across slices of the cellular network.

Orchestrator 738 can allow for the instantiation of new cloud-based components of cellular network 720. As an example, to instantiate a new DU, orchestrator 738 can perform a pipeline of calling the DU code from a software repository incorporated as part of, or separate from, cellular network 720; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 720. Cellular network 720 is shared with some number of other network slices, such as hundreds or thousands of network slices. Communication bandwidth and computing resources of the underlying physical network can be reserved for individual network slices, thus allowing the individual network slices to reliably meet particular service level agreement (SLA) levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, such allocations also account for resource limitations, such as to avoid allocation of an excess of resources to any particular UE group and/or application. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 725-1 and DU 727-1; and a second set of network slices, which may only partially overlap or may be wholly different from the first set, may be reserved at RU 725-2 and DU 727-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 7A, UE 710 may be operating on one or more production slices of cellular network 720. As detailed later in this document, a UE that functions on a particular entity's local network may be assigned to a slice particular to the entity or a slice that provides a particular QoE for tasks to be performed by the entity's UE.

Components such as DUs 727, CU 729, orchestrator 738, and core 739 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 8:
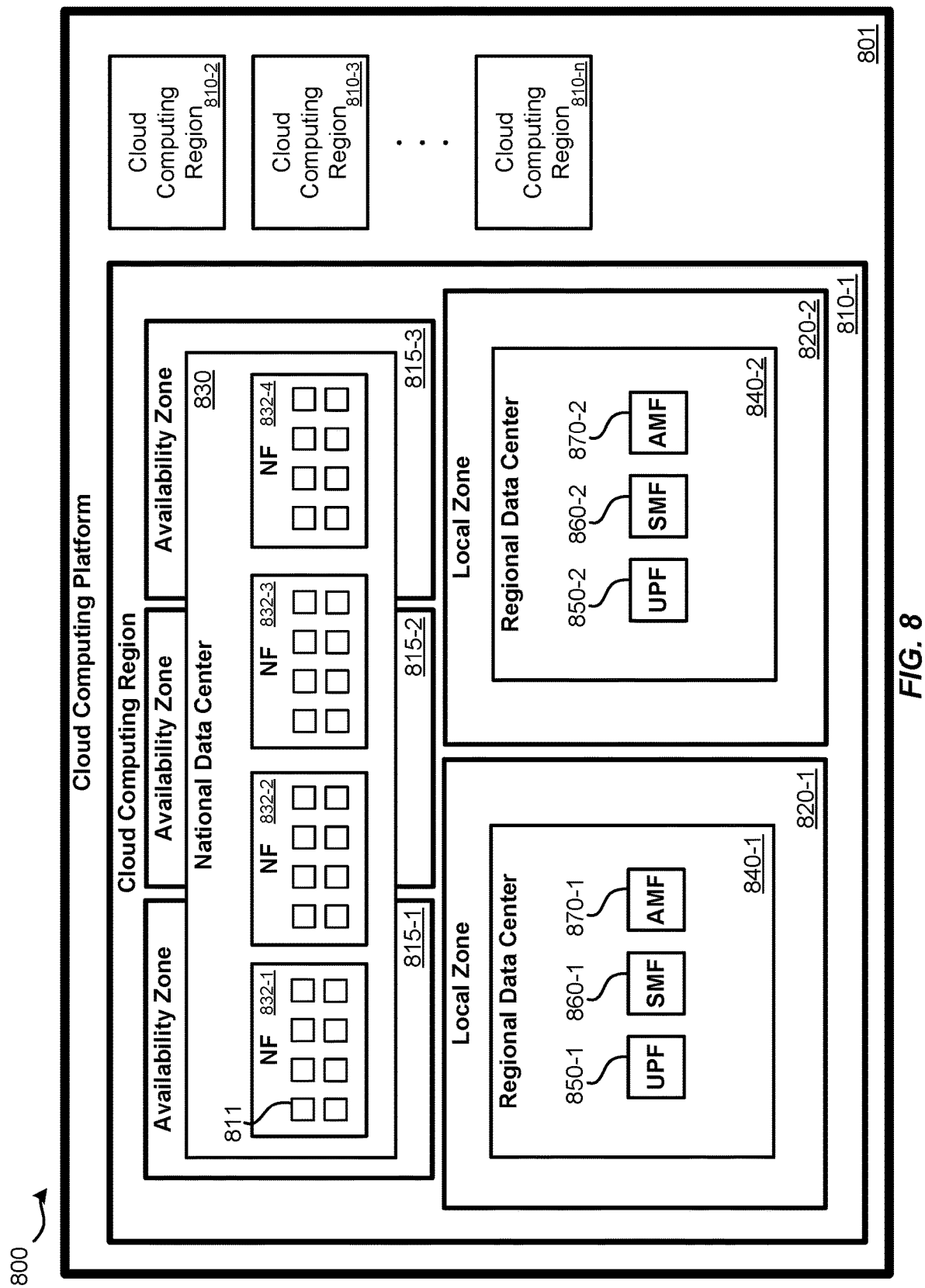
FIG. 8 illustrates an embodiment of a cellular network core network topology as implemented on a public cloud-computing platform, according to certain embodiments.

FIG. 8 illustrates an embodiment of a cellular network core network topology 800 as implemented on a public cloud-computing platform, according to certain embodiments. The cellular network core network topology 800 can be an implementation of the core 739 of FIG. 7A and/or 7B. Cellular network core network topology 800 can represent how logical cellular network groups are distributed across cloud computing infrastructure of cloud computing platform 801. Cloud computing platform 801 can be logically and physically divided up into various different cloud computing regions 810. Each of cloud computing regions 810 can be isolated from other cloud computing regions to help provide fault tolerance, fail-over, load-balancing, and/or stability and each of cloud computing regions 810 can be composed of multiple availability zones, each of which can be a separate data center located in general proximity to each other (e.g., within 600 miles). Further, each of cloud computing regions 810 may provide superior service to a particular geographic region based on physical proximity. For example, cloud computing region 810-1 may have its datacenters and hardware located in the northeast of the United States while cloud computing region 810-2 may have its datacenters and hardware located in California. For simplicity, the details of the cellular network as executed in only cloud computing region 810-1 is illustrated. Similar components may be executed in other cloud computing regions of cloud computing regions 810 (810-2, 810-3, 810-n).

In other embodiments, cloud computing platform 801 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 810 may include multiple availability zones 815. Each of availability zones 815 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 815. For example, a database that is maintained as part of NDC 830 may be replicated across availability zones 815; therefore, if an availability zone of the cloud computing region is unavailable, a copy of the database remains up-to-date and available, thus allowing for continuous or near continuous functionality.

On a (e.g., public) cloud computing platform, cloud computing region 810-1 may include the ability to use a different type of data center or group of data centers, which can be referred to as local zones 820. For instance, a client, such as a provider of the hybrid cloud cellular network, can select from more options of the computing resources that can be reserved at an availability zone 815 compared to a local zone 820. However, a local zone 820 may provide computing resources nearby geographic locations where an availability zone 815 is not available. Therefore, to provide low latency, certain network components, such as regional data centers 840, can be implemented at local zones 820 rather than availability zones 815. In some circumstances, a geographic region can have both a local zone 820 and an availability zone 815.

In the topology of a 5G NR cellular network, 5G core functions of core 739 can logically reside as part of a national data center (NDC) 830. NDC 830 can be understood as having its functionality existing in cloud computing region 810-1 across multiple availability zones 815. At NDC 830, various network functions, such as NFs 832, are executed. For illustrative purposes, each NF 832, whether at NDC 830 or elsewhere located, can be comprised of multiple sub-components, referred to as pods (e.g., pod 811) that are each executed as a separate process by the cloud computing region 810. The illustrated number of pods 811 is merely an example; fewer or greater numbers of pods 811 may be part of the respective 5G core functions. It should be understood that in a real-world implementation, a cellular network core, whether for 5G or some other standard, can include many more network functions. By distributing NFs 832 across availability zones 815, load-balancing, redundancy, and fail-over can be achieved. In local zones 820, multiple regional data centers 840 can be logically present. Each of regional data centers 840 may execute 5G core functions for a different geographic region or group of RAN components. As an example, 5G core components that can be executed within an RDC, such as RDC 840-1, may be: UPFs 850, SMFs 860, and AMFs 870. While instances of UPFs 850 and SMFs 860 may be executed in local zones 820, SMFs 860 may be executed across multiple local zones 820 for redundancy, processing load-balancing, and fail-over.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks. For example, executing instructions stored in the non-transitory computer-readable medium causes the processors to perform steps of methods and/or to implement features of components described herein.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for detecting gray routed messages, the method comprising:
   receiving, by a computing system, a message from a sender via a network;
   determining, by the computing system, one or more characteristics of the message;
   providing, by the computing system, the one or more characteristics to a machine learning model, the machine learning model configured to assign a score to the message based at least in part on the one or more characteristics of the message;
   determining, by the computing system, that the message is a gray-routed message based at least in part on the score assigned to the message; and
   based on a determination that the message is a gray-routed message:
      transmitting, by the computing system, data indicating the message, the one or more characteristics of the message, and the sender to a contextual filtering system, the contextual filtering system configured to identify and filter gray-routed messages from the network
   determining a first routing plan associated with the network;
   providing the first routing plan to the machine learning model;
   determining, by the machine learning model, a predicted traffic window of the network, the predicted traffic window characterized by an increased network load;
   determining, by the machine learning model, a second routing plan such that messages are routed to prevent message congestion; and
   causing messages to be routed via the network according to the second routing plan.

2. The method of claim 1, wherein one or more characteristics comprise data associated with content of the message, the method further including:
   determining, by the machine learning module, that the content of the message includes indicators associated with illegitimate messages; and
   generating, by the machine learning model, the score for the message based at least in part on the indicators associated with the illegitimate messages and a comparison of the content of the message to a typical message.

3. The method of claim 2, wherein the machine learning model comprises a natural language processing model.

4. The method of claim 1, wherein one or more characteristics comprise geographical data associated with the message, the method further including:
   determining, by the machine learning model, that the geographical data is associated with gray-routed messages, the geographical data indicating route comprising a plurality of nodes and a location associated with each respective node; and
   generating, by the machine learning model, the score for the message based at least in part on the determination that the geographical data is associated with gray routed messages.

5. The method of claim 4, wherein the machine learning model comprises a geospatial data analysis model.

6. The method of claim 1, wherein one or more characteristics of the message comprises network information, the method further including:
   determining, by the machine learning model, that the network information of the message is atypical; and
   generating, by the machine learning model, the score for the message based at least in part on the determination that the network information of the message is atypical.

7. The method of claim 6, wherein the machine learning model comprises a clustering model.

8. A system for detecting gray routed messages, comprising:
   one or more processors;
   a machine learning model;
   a contextual filtering system; and
   a non-transitory computer-readable medium comprising instructions that, when executed by the one or more processors, cause the system to perform operations to:
      receive a message from a sender via a network;
      determine one or more characteristics of the message;
      provide the one or more characteristics to the machine learning model, the machine learning model configured to assign a score to the message based at least in part on the one or more characteristics of the message;
      determine that the message is a gray-routed message based at least in part on the score assigned to the message;
      based on a determination that the message is a gray-routed message:
         transmit data indicating the message, the one or more characteristics of the message, and the sender to the contextual filtering system, the contextual filtering system configured to identify and filter illegitimate messages from the network
      determine a first routing plan associated with the network;
      provide the first routing plan to the machine learning model;
      determine, by the machine learning model, a predicted traffic window of the network, the predicted traffic window characterized by an increased network load;
      determine, by the machine learning model, a second routing plan such that messages are routed to prevent message congestion; and
      cause messages to be routed via the network according to the second routing plan.

9. The system of claim 8, wherein the network is a cloud-based wireless network.

10. The system of claim 8, wherein the message is an application to person (A2P) message.

11. The system of claim 8, wherein the machine learning model comprises at least one of a clustering model, a sequential analysis model, and a natural language processing model.

12. The system of claim 8, wherein the instructions further cause the system to:
   receive data indicating an accuracy rating of the score assigned to the message;
   provide the message and the data indicating the accuracy rating of the score to the machine learning model such that the machine learning model is retrained based at least in part on the message and the accuracy rating of the score; and
   store the message and/or the data indicating the accuracy rating of the score in a historical dataset.

13. The system of claim 8, wherein the machine learning model comprises a rules-based filter, wherein rules of the rules-based filter are based at least in part on a regulation.

14. The system of claim 8, wherein the machine learning model comprises a time series forecasting model.

15. The system of claim 8, wherein the contextual filtering system is associated with a 5G wireless network provider.

16. A non-transitory computer-readable medium comprising instructions that, when executed by one or more processors, cause the one or more processors to perform operations comprising:
   receiving, by a computing system, a message from a sender via a network;
   determining, by the computing system, one or more characteristics of the message;
   providing, by the computing system, the one or more characteristics to a machine learning model, the machine learning model configured to assign a score to the message based at least in part on the one or more characteristics of the message;
   determining, by the computing system, that the message is a gray-routed message based at least in part on the score assigned to the message;
   based on a determination that the message is a gray-routed message:
      transmitting, by the computing system, data indicating the message, the one or more characteristics of the message, and the sender to a contextual filtering system, the contextual filtering system configured to identify and filter illegitimate messages from the network
   determine a first routing plan associated with the network;
   provide the first routing plan to the machine learning model;
   determine, by the machine learning model, a predicted traffic window of the network, the predicted traffic window characterized by an increased network load;
   determine, by the machine learning model, a second routing plan such that messages are routed to prevent message congestion; and cause messages to be routed via the network according to the second routing plan.

17. The non-transitory computer-readable medium of claim 16, wherein the network comprises an open-radio access network of a 5G wireless network provider.

18. The non-transitory computer-readable medium of claim 16, wherein the contextual filtering system is associated with a 5G wireless network provider.

19. The non-transitory computer-readable medium of claim 16, wherein the message is an application to person message.

\* \* \* \* \*